(12) United States Patent
Mehlen

(10) Patent No.: US 10,384,621 B2
(45) Date of Patent: Aug. 20, 2019

(54) SWING-AWAY ARTICLE TRANSPORT SYSTEM FOR A MOTOR VEHICLE

(71) Applicant: William D Mehlen, Lethbridge (CA)

(72) Inventor: William D Mehlen, Lethbridge (CA)

( * ) Notice: Subject to any disclaimer, the term of this patent is extended or adjusted under 35 U.S.C. 154(b) by 22 days.

(21) Appl. No.: 15/833,812

(22) Filed: Dec. 6, 2017

(65) Prior Publication Data
US 2019/0168680 A1 Jun. 6, 2019

(51) Int. Cl.
B60R 9/06 (2006.01)
B60R 9/10 (2006.01)
B60R 11/00 (2006.01)

(52) U.S. Cl.
CPC ............ B60R 9/10 (2013.01); B60R 9/06 (2013.01); *B60R 2011/0085* (2013.01)

(58) Field of Classification Search
CPC ..... B60R 9/06; B60R 9/10; B60R 2011/0085; Y10S 224/924
USPC ..................... 224/509, 519, 924
See application file for complete search history.

(56) References Cited

U.S. PATENT DOCUMENTS

| 5,344,175 | A | * | 9/1994 | Speer | B60D 1/58 224/521 |
|---|---|---|---|---|---|
| 5,680,976 | A | * | 10/1997 | Koliopoulos | B60R 9/06 224/282 |
| 5,806,737 | A | * | 9/1998 | Clark | B60R 9/06 224/485 |
| 5,842,615 | A | * | 12/1998 | Goodness | B60R 9/06 224/509 |
| 5,853,278 | A | * | 12/1998 | Frantz | B60R 9/06 414/462 |
| 5,879,102 | A | | 3/1999 | Koliopoulos | |
| 6,085,954 | A | * | 7/2000 | Bloemer | B60R 9/06 224/502 |
| 6,123,498 | A | * | 9/2000 | Surkin | B60R 9/06 224/509 |
| 6,199,735 | B1 | | 3/2001 | Cothern et al. | |
| 6,237,823 | B1 | * | 5/2001 | Stewart | B60R 9/065 224/282 |
| 6,386,410 | B1 | | 5/2002 | VanDusen | |
| 7,004,491 | B1 | * | 2/2006 | Allsop | B60D 1/52 280/491.2 |
| 7,261,229 | B1 | * | 8/2007 | Allen | B60R 9/06 224/495 |
| 7,591,404 | B2 | * | 9/2009 | LeDuc | B60R 9/06 126/276 |

(Continued)

*Primary Examiner* — Justin M Larson
(74) *Attorney, Agent, or Firm* — Morland C. Fischer

(57) ABSTRACT

Disclosed is a swing-away article transport system to be detachably connected to the rear of a motor vehicle. The article transport system has a stationary base that is coupled to the usual hitch adjacent the rear bumper of the vehicle and a rotatable swing arm having a swing arm mounted hitch to which an article (e.g., a platform bike rack) is to be attached. The swing arm is rotatable relative to the stationary base between a closed position lying above and in parallel alignment with the stationary base and an open position extending outwardly from the stationary base to form an angle of approximately 90°. In its open position, the rotatable swing arm extends away from the vehicle whereby the article is located at one side of the vehicle so as to permit access to a storage compartment at the rear of the vehicle without interference from the article being transported.

21 Claims, 5 Drawing Sheets

(56) References Cited

U.S. PATENT DOCUMENTS

| | | | | |
|---|---|---|---|---|
| 7,631,791 B1* | 12/2009 | Allen | ............ | B60R 9/10 |
| | | | | 224/503 |
| 8,857,689 B2* | 10/2014 | Levi | ............ | B60R 3/005 |
| | | | | 224/497 |
| 9,381,868 B2 | 7/2016 | Anyan et al. | | |
| 9,475,353 B2 | 10/2016 | Mehlen | | |
| 2005/0103816 A1* | 5/2005 | Flannery | ............ | B60R 9/06 |
| | | | | 224/509 |
| 2006/0186638 A1 | 8/2006 | Varner | | |
| 2006/0273125 A1* | 12/2006 | Bogoslofski | ............ | B60R 9/06 |
| | | | | 224/509 |
| 2012/0292357 A1* | 11/2012 | Tennyson | ............ | B60R 9/06 |
| | | | | 224/281 |
| 2012/0305612 A1* | 12/2012 | Bell, Jr. | ............ | B60R 9/06 |
| | | | | 224/519 |
| 2015/0203049 A1* | 7/2015 | Eichmann | ............ | B60D 1/42 |
| | | | | 224/509 |
| 2016/0129847 A1* | 5/2016 | Mehlen | ............ | B60R 9/065 |
| | | | | 224/509 |

\* cited by examiner

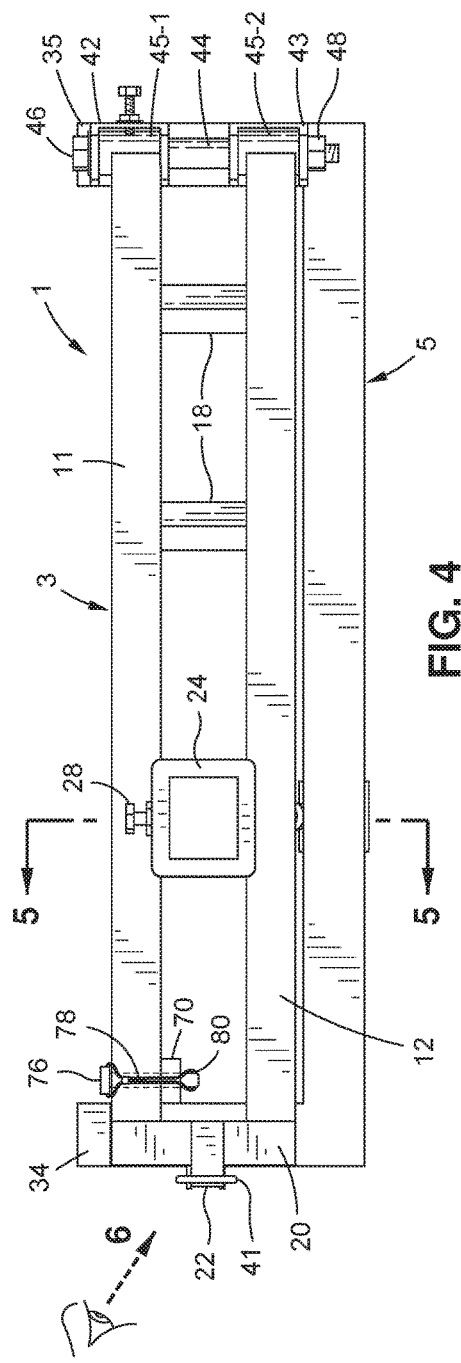

SWING-AWAY ARTICLE TRANSPORT SYSTEM FOR A MOTOR VEHICLE

BACKGROUND OF THE INVENTION

1. Field of the Invention

This invention relates to a swing-away article transport system to be attached to a hitch at the rear of a motor vehicle and having a rotatable upper swing arm to which a platform bike rack or the like can be coupled. The upper swing arm is rotatable relative to a stationary lower base that is held in place alongside the rear bumper of the motor vehicle to permit access to the rear of the vehicle without interference from the bike rack that is coupled to and rotatable with the swing arm.

2. Background Art

It is known to transport one or more bicycles from the rear of a moving motor vehicle. In this case, the bicycles are carried by a platform bike rack or the like. The bike rack is typically attached to the motor vehicle by sliding a hitch coupler of the rack into removable receipt by a hollow hitch affixed below the rear bumper of the vehicle. While the bicycles carried by the bike rack may be conveniently transported from place-to-place with the vehicle, the presence of the bicycles and the rack can interfere with easy access to the rear of the vehicle especially when it becomes necessary for an individual to add to or remove cargo from a storage space by way of the vehicle's trunk or hatch. This potential problem may become acute when the vehicle is a small truck of the kind having a fold-down tail gate. Consequently, it may be necessary for the bicycles and/or the bike rack to first be removed from the rear of the vehicle before the individual can gain access to a storage compartment thereof.

My U.S. Pat. No. 9,475,353 granted Oct. 25, 2016 describes a unique swing-away hitch adapter system that is mounted at the rear of a motor vehicle and rotatable relative thereto to facilitate an individual's ability to access a storage compartment of the vehicle without interference from an article that is attached to the hitch adapter system. It is now desirable to have available another swing-away system that is particularly adapted to be coupled to a bicycle rack by which one or more bicycles are carried at the rear of a motor vehicle while avoiding the inconveniences that are described in the paragraph above.

SUMMARY OF THE INVENTION

In general terms, a swing-away article transport system is disclosed to be mounted at the rear of a motor vehicle at which to transport an article such as, for example, a platform bike rack that carries one or more bicycles. The article transport system includes a stationary lower base and a rotatable upper swing arm having opposite free and coupled ends and being rotatable relative to the stationary lower base through a horizontal plane between a closed position lying above and in parallel alignment with the stationary lower base adjacent the rear bumper of the vehicle and an open position extending outwardly from the stationary lower base so as to form an angle of about 90° therewith.

The stationary lower base is coupled to the rear of the motor vehicle by means of a hitch coupler projecting therefrom for slidable receipt by a conventional tubular hitch of the vehicle. An anti-wobble fastener extends at an angle through the hitch coupler of the lower base to abut the outer end of the tubular hitch of the vehicle to function as a stop and thereby prevent the hitch coupler from wobbling within the hitch when the vehicle is in motion. A tubular swing arm mounted hitch extends perpendicularly through the rotatable upper swing arm to which the aforementioned article (e.g., bike rack) can be removably connected so that the article rotates back and forth with the upper swing arm. By virtue of the foregoing, when the swing arm of the article transport system is rotated to its open position, the hitch mounted article being transported is correspondingly rotated away from the rear and to one side of the vehicle to enable an easy access to a storage compartment at the rear of the vehicle without having to first separate the article being transported by the article transport system.

A locking post stands upwardly from one end of the stationary lower base of the article transport system, and a pivot support post stands upwardly from the opposite end thereof. Upper and lower cylindrical swing arm attachment rods run laterally along the rotatable upper swing arm for receipt within respective rod receiving recesses that are formed one above the other in the upstanding locking post when the upper swing arm is rotated to its closed position at which the free end of the upper swing arm lies flush against the locking post. A locking ring that is affixed to the outside of the locking post is moved into surrounding engagement with and exerts a pulling force on a locking tab that extends outwardly from the free end of the rotatable upper swing arm to hold the swing arm in place in its closed position.

A pair of coupling collars are located at the coupled end of the rotatable upper swing arm. The coupling collars are received within and surrounded by respective C-shaped swing arm coupling brackets that are affixed one above the other to the front of the upstanding pivot support post of the stationary lower base. An elongated pivot pin is pushed downwardly through axially aligned holes that are formed in the coupling brackets and the coupling collars to establish a pivot axis around which the rotatable upper swing arm rotates between its closed and open positions.

BRIEF DESCRIPTION OF THE DRAWINGS

FIG. 4 shows a front view of the swing-away article transport system with the rotatable upper swing arm rotated to its closed position and lying above the stationary lower base;

FIG. 5 is a cross section of the article transport system taken through lines 5-5 of FIG. 4;

DESCRIPTION OF THE PREFERRED EMBODIMENT

Figure 1:
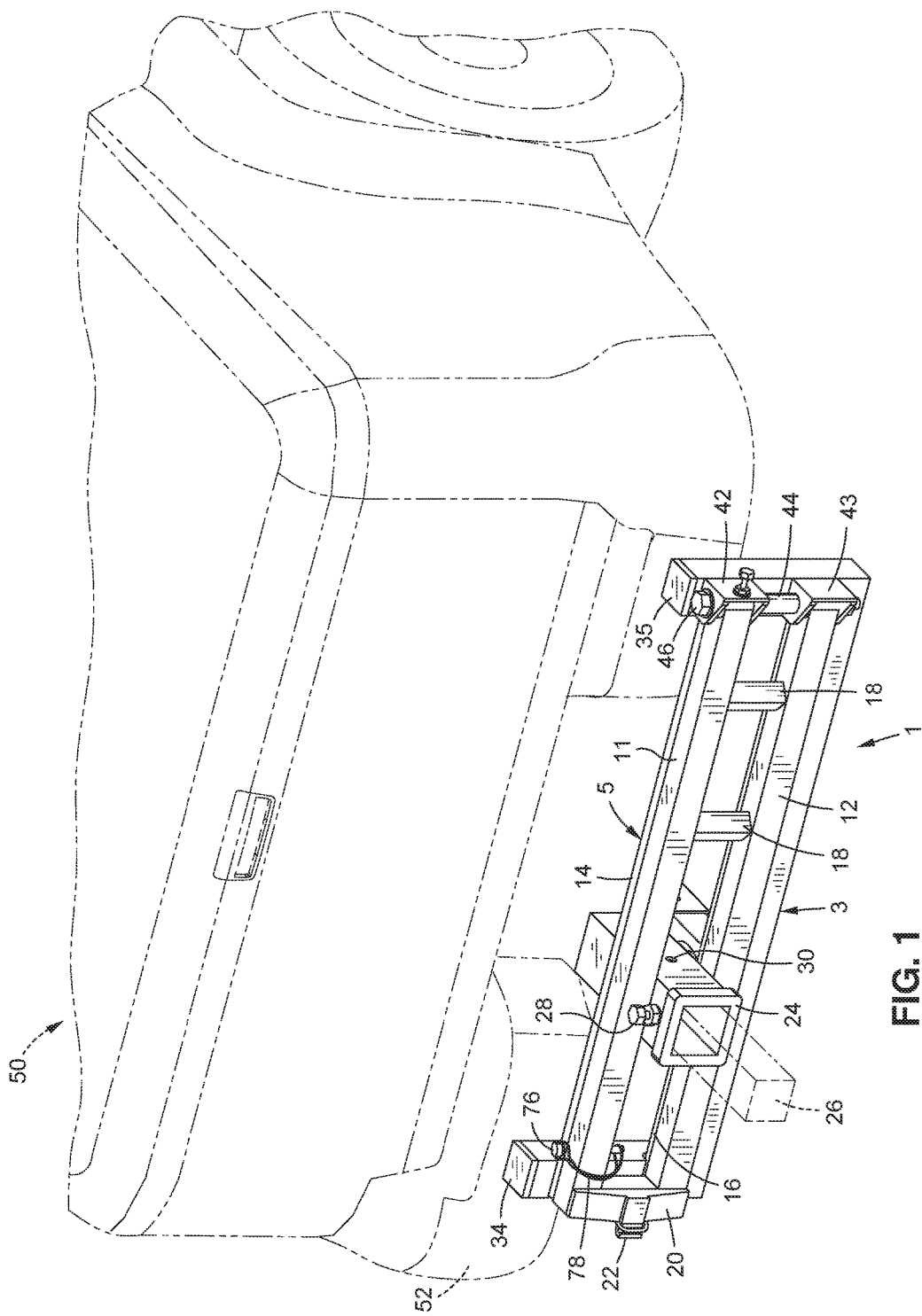
FIG. 1 shows a swing-arm article transport system according to a preferred embodiment mounted at the rear of a motor vehicle and having a stationary lower base attached to the vehicle and a rotatable upper swing arm rotated to a closed position and lying above the stationary lower base.

Referring concurrently to FIGS. 1-5 of the drawings, there is shown a swing-away article transport system 1 according to a preferred embodiment of this invention. The article transport system 1 is particularly adapted to be coupled to the rear of the motor vehicle 50, such as the truck shown in FIGS. 1 and 3. However, the type of vehicle to which the article transport system 1 is to be coupled forms no part of this invention. As will be disclosed in greater detail hereinafter, the article transport system 1 enables a hitch mounted article (not shown) such as, for example, a platform bike rack or the like, to be transported at the rear of the vehicle 50 while advantageously enabling the vehicle operator to have access to the rear of his vehicle without being subjected to interference from the article transport system or the article transported thereby.

The swing-away article transport system 1 includes a stationary lower base 3 and a rotatable upper swing arm 5. The stationary lower base 3 is detachably connected to the rear of the motor vehicle 50 so as to lie alongside the rear bumper 52 of the motor vehicle. The lower base 3 of the hitch receiver system 1 has a hollow hitch coupler 7 (best shown in FIG. 5) extending outwardly therefrom. The rear of the motor vehicle 50 has a conventional tubular hitch 54 extending outwardly and rearwardly therefrom below the rear bumper 52. The article transport system 1 is coupled to the vehicle 50 when the hitch coupler 7 that extends from the stationary lower base 3 is pushed inwardly and into removable receipt by the tubular hitch 54 of the vehicle.

Figure 2:
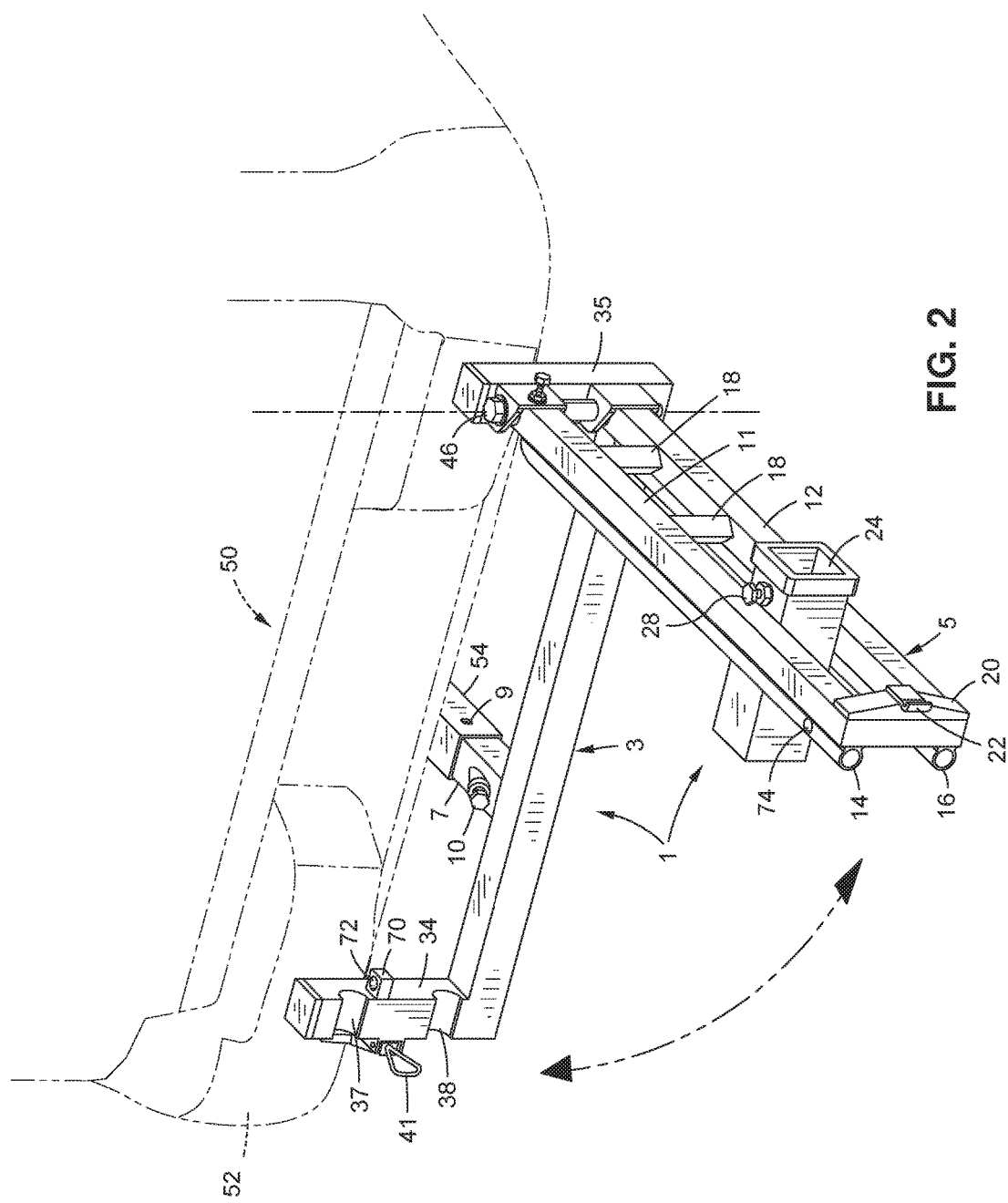
FIG. 2 shows the swing-away article transport system of FIG. 1 with the upper swing arm rotated through a horizontal plane to an open position at which to extend outwardly from the stationary lower base.

The article transport system 1 is thereby carried by the motor vehicle 50 with the stationary lower base 3 lying behind and in parallel alignment with the rear bumper 52 of vehicle 50 as shown in FIGS. 1 and 2. Because of its connection to the hitch 54 at the rear of the vehicle 50, the lower base 3 remains at all times stationary. A fastener (not shown) is inserted through pairs of axially aligned holes 8 and 9 (best shown in FIG. 3) that are formed in the hitch coupler 7 and the tubular hitch 54 which receives and surrounds the hitch coupler to prevent an inadvertent separation of the coupler 7 and the article transport system 1 from hitch 54 when the vehicle 50 is in motion. However, should it be desirable to uncouple and separate the article transport system 1 from the rear of the vehicle 50, the aforementioned fastener is removed so that the coupler 7 can be pulled outwardly and disconnected from the hitch 54.

Turning briefly to FIG. 5, there is shown a threaded anti-wobble fastener 10 (e.g., a bolt) that is rotatable through a threaded sleeve 13 which runs at an angle completely through the hitch coupler 7. The anti-wobble fastener 10 is rotated through the hitch coupler 7 by way of the threaded sleeve 13. The bottom of the anti-wobble fastener 10 exits the bottom of the hitch coupler 7 at an angle so as to abut the outside end of the vehicle hitch 54 that surrounds hitch coupler 7. By virtue of the anti-wobble fastener 10 lying in contact with the vehicle hitch 54 after extending completely through the hitch coupler 7, a stop is created by which to reduce the bouncing or wobbling of the hitch coupler 7 within and relative to the vehicle hitch 54 as might otherwise occur when the vehicle 50 is in motion.

The rotatable upper swing arm 5 of the swing-away article transport system 1 is pivotally connected to the stationary lower base 3 so as to be rotatable relative to the lower base from a folded and closed position (best shown in FIG. 1) to an outstretched and open position (best shown in FIG. 2). In its closed position, the upper swing arm 5 lies behind the rear bumper 52 of the motor vehicle 50 above and in parallel alignment with the stationary lower base 3. In its open position, the upper swing arm 5 is rotated through a horizontal plane in a counter-clockwise direction away from the stationary lower base 3 so as to be aligned therewith at an angle of about 90°. The lower base 3 and the upper swing arm 5 of system 1 preferably have an identical length extending across the rear of the motor vehicle 50.

The rotatable upper swing arm 5 of the swing-away article transport system 1 includes upper and lower horizontally disposed swing arm reinforcing bars 11 and 12 that extend in spaced, parallel alignment relative to one another between opposite free and coupled ends of the swing arm 5. A pair of cylindrical swing arm attachment rods 14 and 16 (best shown in FIG. 2) are fixedly attached (e.g., welded) to the rear of respective ones of the reinforcing bars 11 and 12. A set of parallel aligned braces 18 extend vertically between the upper and lower reinforcing bars 11 and 12 of the upper swing arm 5 to preserve the spaced, parallel alignment thereof.

A locking plate 20 is affixed (e.g., welded) to the free end of the rotatable upper swing arm 5 of the article transport system 1 so as to extend vertically between the pair of reinforcing bars 11 and 12 thereof. A locking tab 22 is affixed to the locking plate 20 so as to extend outwardly from the free end of swing arm 5.

A tubular swing arm mounted hitch 24 runs through the upper swing arm 5 of the article transport system 1 between the pair of spaced swing arm reinforcing bars 11 and 12. The hitch 24 and the swing arm 5 have longitudinal axes that are aligned perpendicular to one another. The swing arm mounted hitch 24 is sized and configured to receive an auxiliary hitch coupler (shown in phantom lines and designated 26 in FIGS. 1 and 5) that is associated with the aforementioned hitch mounted article (e.g., a platform bike rack) so that the article can be detachably coupled to the swing-away article transport system 1 at the rear of the motor vehicle 50. That is, the hitch mounted article is coupled to the upper swing arm 5 when the auxiliary hitch coupler 26 thereof is moved inwardly and into removable receipt by the tubular swing arm mounted hitch 24.

A threaded anti-wobble fastener 28 (best shown in FIG. 5) such as a bolt or the like is rotated through a threaded hole that is formed in the tubular swing arm mounted hitch 24 so as to move into contact with the auxiliary hitch coupler 26 that is received within and surrounded by hitch 24. As in the case of the anti-wobble fastener 10 of FIG. 5, the engagement of the auxiliary hitch coupler 26 by the anti-wobble fastener 28 applies pressure to reduce the bouncing or wobbling of the hitch coupler 26 within and relative to the swing arm mounted hitch 24 as might otherwise occur when the vehicle 50 is in motion.

Axially aligned holes 30 and 32 are formed completely through the tubular swing arm mounted hitch 24 and the auxiliary hitch coupler 26 surrounded by hitch 24. A locking fastener (not shown) is inserted through the holes 30 and 32 to prevent an inadvertent separation of the hitch coupler 26 from hitch 24 and the hitch mounted article from the swing-away article transport system 1 at the rear of the vehicle 50. However, should it be desirable to separate the hitch mounted article from the article transport system 1, the locking fastener is removed so that the auxiliary hitch coupler 26 of the article can then be withdrawn and detached from the swing arm mounted hitch 24.

A locking post 34 (best shown in FIG. 2) stands vertically upward from a first end of the stationary lower base 3 of the swing-away article transport system 1. A pair of semi-cylindrical rod receiving recesses 37 and 38 are formed one above the other in the locking post 34 and configured to receive respective ones of the cylindrical swing arm attachment rods 14 and 16 that are carried by the rotatable upper swing arm 5 so that a snug fit is established therebetween when the upper swing arm 5 is rotated to its closed position relative to and lying above the stationary lower base 3 of article transport system 1 (best shown in FIGS. 1 and 5).

Figure 6:
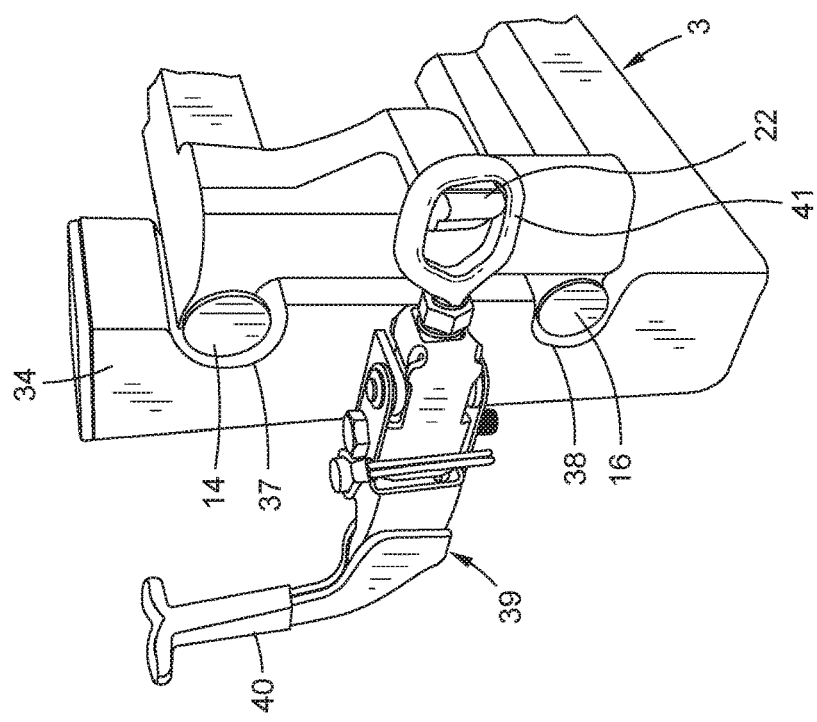
FIG. 6 is an enlarged detail showing a free end of the rotatable upper swing arm of the swing-away article transport system held in place and lying flush against an upstanding locking post of the stationary lower base when the swing arm is rotated to its closed position.

A locking arm 39 (best shown in FIG. 6) is affixed (e.g., welded) to the outside of the upstanding locking post 34 of the stationary lower base 3. Located at one end of the locking arm 39 is a manually operable and rotatable handle 40. Located at the opposite end of the locking arm 39 is a locking ring 41. The locking ring 41 is sized to surround and engage the locking tab 22 which extends outwardly from the free end of the rotatable upper swing arm 5.

The handle 40 of locking arm 39 is coupled to the locking ring 41, such that rotating the handle 40 in a downward direction causes a corresponding rearward movement of the locking ring 41 towards the rear of the vehicle 50. In this case, the locking ring 41 exerts a rearward pulling force against the locking tab 22, whereby to hold the rotatable upper swing arm 5 in its closed position lying above the stationary lower base 3 with the free end of the swing arm 5 pulled towards the locking post 34. It may be appreciated that when the cylindrical swing arm attachment rods 14 and 16 that are carried by the rotatable swing arm 5 are located within the rod receiving recesses 37 and 38 formed in the upstanding locking post 34 and the locking tab 22 is captured and pulled rearwardly by the locking ring 41, the free end of the upper swing arm 5 will be held flush against the face of the locking post 34 so as to avoid horizontal and vertical displacements thereof as may be caused by vibrations when the vehicle is in motion.

When the handle 40 of locking arm 39 is rotated in an upward direction, the locking ring 41 is correspondingly moved in a forward direction away from the rear of vehicle 50. In this case, the aforementioned rearward pulling force exerted by the locking ring 41 on the locking tab 22 is terminated at which time the locking ring 41 may be tilted away from and out of its surrounding engagement with the locking tab 22 in order to enable the swing arm 5 to then be rotated from its closed position as show in FIG. 1 to its open position as shown in FIG. 2.

A pivot support post 35 stands vertically upward from the opposite end of the stationary lower base 3, such that the locking post 34 and the pivot support post 35 lie parallel and opposite one another at the first and opposite ends of the lower base 3. A pair of generally "C"-shaped swing arm coupling brackets 42 and 43 are affixed (e.g., welded) one above the other to opposite ends of a tubular pivot guide 44. The coupling brackets 42 and 43 are affixed (e.g., welded) to the front of the upstanding pivot support post of the lower base 3. A pair of hollow coupling collars 45-1 and 45-2 are affixed (e.g., welded) one above the other to the coupled end of the upper swing arm 5, such that one coupling collar 45-1 is located at a coupled end of the upper reinforcing bar 11 of swing arm 5, and the other coupling collar 45-2 is located at a coupled end of the lower reinforcing bar 12 of swing arm 5 (best shown in FIG. 3).

The rotatable upper swing arm 5 of the swing-away article transport system 1 is pivotally coupled to the upstanding pivot support post 35 of the stationary lower base 3 of the article transport system 1 when the pair of hollow coupling collars 45-1 and 45-2 that are located at the coupled end of swing arm 5 are mated to respective ones of the pair of C-shaped swing arm coupling brackets 42 and 43 at the front of the pivot support post 35.

More particularly, a first coupling collar 45-1 at the coupled end of the upper reinforcing bar 11 of swing arm 5 is positioned within the C-shaped swing arm coupling bracket 42, and the second coupling collar 45-2 at the coupled end of the lower reinforcing bar 12 of swing arm 5 is positioned within the C-shaped swing arm coupling bracket 43 that lies below the coupling bracket 42. The pair of coupling collars 45-1 and 45-2 and the tubular pivot guide 44 that is located between the pair of coupling brackets 42 and 43 are axially aligned with one another and with a plurality of bracket holes 47 that are formed through the top and the bottom of each of the C-shaped coupling brackets 42 and 43.

Figure 3:
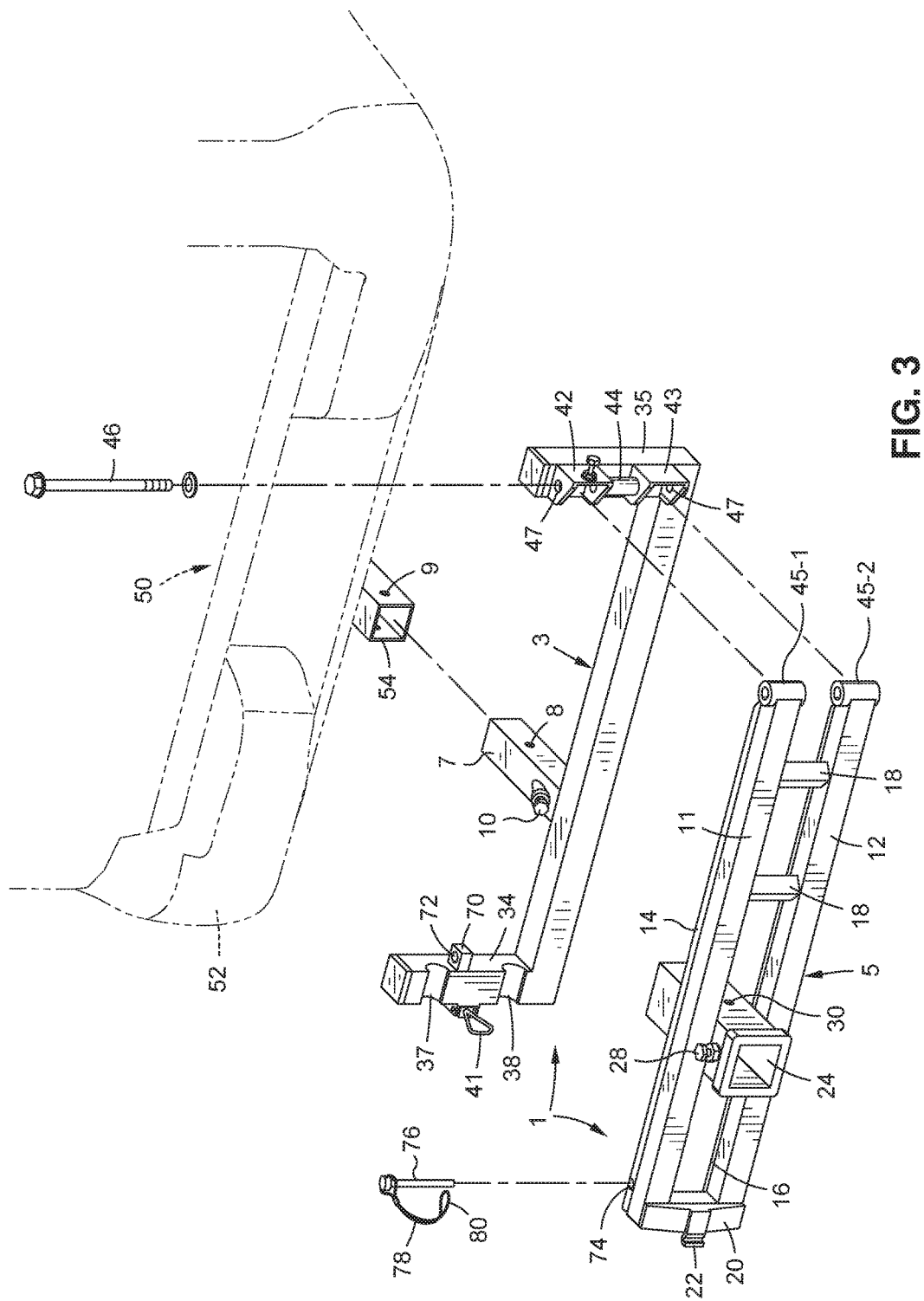
FIG. 3 is an exploded view of the swing-away article transport system showing the rotatable upper swing arm and the stationary lower base uncoupled from one another.

As is best shown in FIG. 3, an elongated pivot pin 46 having a wide head at one end and a set of threads at the opposite end is moved downwardly through the axially aligned coupling collars 45-1 and 45-2, the tubular pivot guide 44, and the plurality of bracket holes 47. The pivot pin 46 establishes a pivot axis around which the rotatable upper swing arm 5 rotates between its closed and open positions of FIGS. 1 and 2. A threaded nut 48 (best shown in FIG. 4) is rotated into mating engagement with the threads of the pivot pin 46, whereby to hold the pin in place and prevent an inadvertent removal thereof due to vibrations when the vehicle 50 is in motion. In the alternative, the threaded nut 48 can simply be affixed (e.g., welded) to the bottom of the swing arm coupling bracket 43.

As was previously described, the rotatable upper swing arm 5 of the swing-away article transport system 1 is rotatable relative to the stationary lower base 3 through an angle of about 90° from a closed position to an open position to enable access to the rear of the motor vehicle at which the article transport system 1 is attached. That is, when the swing arm 5 is rotated to its open position of FIG. 2, the hitch mounted article (e.g., bike rack) that is coupled to the article transport system 1 is correspondingly moved with the swing arm 5 through a horizontal plane so as to be spaced rearwardly from the rear bumper 52 and lie at one side of the vehicle 50. It is advantageous for the coupled end of the rotatable upper swing arm 5 to be pivotally coupled to pivot support post 35 of the stationary lower base 3 at two points (i.e., the pair of coupling collars 45-1 and 45-2) positioned one above the other to prevent the swing arm 5 from tilting downwardly under its own weight during its rotation.

Figure 7:
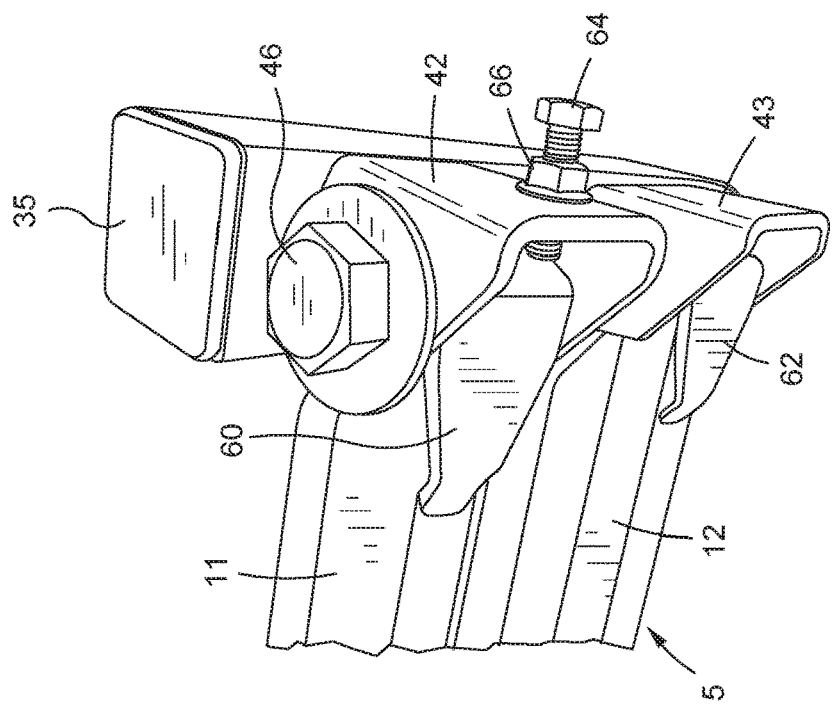
FIG. 7 is an enlarged detail showing the opposite coupled end of the rotatable swing arm pivotally coupled to an upstanding pivot support post of the stationary base and a swing arm rotation adjustment bolt engaging the coupled end of the swing arm to control the rotation thereof.

Referring now to FIGS. 3 and 7 of the drawings, there is shown an optional swing arm rotation adjustment means to enable the angle through which the swing arm 5 rotates between its closed and open positions to be selectively adjusted. The swing arm rotation adjustment means includes a pair of wrap-around adjustment clamps 60 and 62 that are affixed (e.g., welded) to respective ones of the coupling collars 45-1 and 45-2 located at the coupled end of the rotatable upper swing arm 5. The wrap-around adjustment clamps 60 and 62 are located inside the C-shaped swing arm coupling brackets 42 and 43 which surround the coupling collars 45-1 and 45-2. The wrap-around adjustment clamps 60 and 62 bend around the coupling collars 45-1 and 45-2 so as to lie against the fronts of respective ones of the upper and lower reinforcing bars 11 and 12 of the upper swing arm 5 at the coupled end thereof.

The swing arm rotation adjustment means also includes a threaded adjustment bolt 64 that is received through one of the pair of C-shaped swing arm coupling brackets (e.g., 42) by way of a threaded nut 66 that is affixed (e.g., welded) to the outside of the coupling bracket. The adjustment bolt 64 us rotated through nut 66 and a hole formed in the swing arm coupling bracket 42 so as to move a variable distance towards the wrap-around adjustment clamp 60 which lies inside the coupling bracket 42.

When the rotatable swing arm 5 is rotated from its closed position of FIG. 1 towards its open position of FIG. 2, the adjustment bolt 64 can be positioned inside the swing arm coupling bracket 42 to contact the wrap-around adjustment clamp 60 lying against the front of the upper reinforcing bar 11. The angle through which the upper swing arm 5 is rotated toward its open position is adjustably controlled by the particular position of the adjustment bolt 64 and the corresponding distance it has been moved inwardly through the coupling bracket 42. By controlling the rotation of the upper swing arm 5, the location of the hitch mounted article being transported by the swing-away transport system 1 relative to the rear of the motor vehicle 50 is also adjustably controlled.

The swing-away article transport system 1 is shown with a redundant or supplemental swing arm restraining means which is added to hold the free-end of the rotatable upper swing arm 5 in its closed position lying flush against the face of the upstanding locking post 34 of the stationary lower base 3 in the event that the locking ring 41 that pulls against the locking tab 22 of swing arm 5 should fail, in which case the swing arm could accidentally rotate towards its open position while the vehicle 50 is in motion. As is best shown in FIG. 3, the redundant swing arm restraining means includes a swing arm retaining block 70 that is affixed (e.g., welded) to the inside of the locking post 34. The retaining block 70 has a hole 72 extending therethrough to be moved into axial alignment with a hole 74 that runs vertically and completely through the swing arm attachment rod 14 being carried by the upper swing arm 5.

When the upper swing arm 5 is rotated to its closed position such that the swing arm attachment rods 14 and 16 are received within respective rod receiving recess 37 and 38 of the locking post 34 standing upwardly from the stationary lower base 3, the attachment rod 14 will lie above the retaining block 70 that is affixed to the side of locking post 34. At this time, the holes 74 and 72 will be axially aligned one over the other.

A headed swing arm retaining pin 76 is inserted downwardly through the axially aligned holes 74 and 72. A tether 78 that is tied at one end thereof to the head of the retaining pin 76 has a loop 80 at the opposite end. As is best shown in FIGS. 1 and 4, with the headed swing arm retaining pin 76 running through the axially aligned holes 74 and 72 in the swing arm attachment rod 14 and the swing arm retaining block 70, the loop 80 of the tether 78 is pulled around the upper reinforcing bar 11 of the rotatable swing arm 5 and coupled to the bottom of retaining pin 76 so as to prevent an inadvertent removal thereof. Accordingly, the retaining pin 76 holds the rotatable upper swing arm 5 in place in its closed position above the stationary lower base 3 to prevent a horizontal displacement of the swing arm 5 relative to the lower base 3.

The invention claimed is:

1. A swing-away vehicle mourned article transport system to be coupled to a hitch at the rear of a motor vehicle and adapted to transport an article, said article transport system comprising:

a stationary base having a hitch coupler extending therefrom for receipt by the hitch at the rear of the motor vehicle by which said swing-away article transport system is coupled to said vehicle hitch;

a rotatable swing arm having opposite free and coupled ends, the coupled end of said swing arm being pivotally coupled to said stationary base such that said swing arm is rotatable relative to said stationary base between a closed position lying side-by-side said stationary base at the rear of the motor vehicle and an open position extending outwardly from said stationary base and away from the rear of the motor vehicle; and a coupler connected to said rotatable swing arm to which the article to be transported by said swing-away article transport system is to be attached so that the article and said rotatable swing arm rotate together when said swing arm rotates between said closed and open positions, said stationary base having first and opposite ends and a locking post standing upwardly from the first of said ends such that the free end of said rotatable swing arm lies against said upstanding locking post when said swing arm is rotated to said closed position, the free end of said rotatable swing arm having a locking tab extending therefrom, and the upstanding locking post of said stationary base having a locking tab catch, said locking tab catch engaging said locking tab to hold the free end of said rotatable swing arm against said upstanding, locking post after said swing arm is rotated to said closed position.

2. The swing-away vehicle mounted article transport system recited in claim 1, wherein the coupler connected to said rotatable swing arm is a swing arm mounted hitch to which the article to be transported by said swing-away article transport system is to be attached.

3. The swing away vehicle mounted article transport system recited in claim 2, wherein said swing arm mounted hitch and said rotatable swing arm have longitudinal axes that are perpendicularly aligned relative to one another.

4. The swing-away vehicle mounted article transport system recited in claim 1, wherein said rotatable swing arm lies above and extends in parallel alignment with said stationary base at the rear of the motor vehicle when said rotatable swing arm is rotated relative to said stationary base to said closed position.

5. The swing-away vehicle mounted article transport system recited in claim 4, wherein said rotatable swing arm and said stationary base form an angle of substantially 90° when said rotatable swing arm is rotated relative to said stationary base to said open position.

6. The swing-away vehicle mounted article transport system recited in claim 5, wherein said rotatable swing arm is rotated relative to said stationary base through a horizontal plane between said closed and open positions.

7. The swing-away vehicle mounted article transport system recited in claim 1, further comprising an anti-wobble stop extending completely through and outwardly from the hitch coupler of said stationary base to engage the hitch at the rear of the motor vehicle within which said hitch coupler is received so as to reduce wobbling of said hitch coupler within said vehicle hitch when the motor vehicle is in motion.

8. The swing-away vehicle mounted article transport system recited in claim 7, wherein said anti-wobble stop is a threaded fastener that extends at an angle completely through and outwardly from the hitch coupler of said stationary base by way of a threaded sleeve that runs at an angle through said hitch coupler so that said threaded fastener abuts an end of said vehicle hitch through which said hitch coupler is received.

9. The swing-away vehicle mounted article transport system recited in claim 1, wherein the upstanding locking post of said stationary base has at least one rod receiving recess formed therein, and said rotatable swing arm has at least one swing arm attachment rod located at the free end thereof, said at least one swing arm attachment rod being received within said at least one rod receiving recess when said swing arm is rotated to said closed position and the free end of said swing arm lies against the upstanding locking post of said stationary base.

10. The swing-away vehicle mounted article transport system recited in claim 1, further comprising a swing arm retaining block attached to the upstanding locking post of said stationary base and having a hole formed therein and extending completely therethrough and being axially aligned with a hole formed in the free end of said rotatable swing arm when said swing arm is rotated to its closed position lying side-by-side said stationary base, and a swing arm retaining pin extending through the axially aligned holes formed in said swing arm retaining block and the free end of said rotatable swing arm to prevent said swing arm from rotating relative to said stationary base from said closed position with the free end of said swing arm lying against said upstanding locking post towards said open position extending outwardly from said stationary base.

11. The swing-away vehicle mounted article transport system recited in claim 1, wherein the opposite end of said stationary base has a pivot support post standing upwardly therefrom, the coupled end of said rotatable swing arm being pivotally coupled to said stationary base at the upstanding pivot support post thereof so that said swing arm is rotatable relative to said stationary base between said closed and open positions.

12. The swing-away vehicle mounted article transport system recited in claim 11, wherein the coupled end of said rotatable swing arm has at least one coupling collar and the upstanding pivot support post of said stationary base has at least one coupling bracket affixed thereto, said one coupling collar being pivotally connected to said one coupling bracket so that said swing arm is rotatable at said one coupling collar relative to said stationary base between said closed and open positions.

13. The swing-away vehicle mounted article transport system recited in claim 11, wherein the coupled end of said rotatable swing arm has a pair of coupling collars located one above the other and the upstanding pivot support post of said stationary base has a pair of C-shaped coupling brackets located one above the other, said pair of coupling collars being pivotally connected to and surrounded by respective ones of said pair of C-shaped coupling brackets to prevent said swing arm from tilting in a vertical direction when said swing arm rotates at said pair of coupling collars relative to said stationary base between said closed and open positions.

14. The swing-away vehicle mounted article transport system recited in claim 13, further comprising a pivot pin extending vertically through each of said pair of coupling collars and each of said pair of C-shaped coupling brackets which surround respective ones of said coupling collars, whereby the coupled end of said rotatable swing arm is pivotally coupled to the upstanding pivot support post of said stationary base and said swing arm is rotatable at said pair of coupling collars relative to said stationary base.

15. The swing-away vehicle mounted article transport system recited in claim 13, further comprising a swing arm rotation adjustment bolt extending an adjustable distance through one of said pair of C-shaped coupling brackets at the upstanding pivot support post of said stationary base so as to move towards the respective coupling collar that is surrounded by said one C-shaped coupling bracket to selectively control the angle of rotation of said rotatable swing arm relative to said stationary base depending upon the particular distance moved by said swing arm rotation adjustment bolt through said one coupling bracket.

16. The swing-away vehicle mounted article transport system recited in claim 15, further comprising a wrap-around clamp that is attached to and bends around the respective coupling collar that is surrounded by the one of said pair of C-shaped coupling brackets through which said swing arm rotation adjustment bolt extends, said adjustment bolt being moved an adjustable distance through said one C-shaped coupling bracket to engage said wrap around clamp and thereby control the angle through which said rotatable swing arm is rotated depending upon the distance moved by said adjustment bolt towards said coupling collar and the wrap-around clamp attached to and bending around said coupling collar.

17. The swing-away vehicle mounted article transport system recited in claim 1, wherein the locking tab catch connected to the upstanding locking post of said stationary base is a locking ring that surrounds and engages the locking tab extending from the free end of said rotatable swing arm to hold said rotatable swing arm against said upstanding locking post after said rotatable swing arm is rotated to said closed position.

18. The swing-away vehicle mounted article transport system recited in claim 17, further comprising a manually operated locking arm to which a pulling force is manually applied, said manually operated locking arm communicating with said locking ring to apply a pulling force thereto in response to the pulling force being manually applied to said locking arm when said locking ring surrounds and engages the locking tab that extends from the free end of said rotatable swing arm whereby to hold said rotatable swing arm against said upstanding locking post and prevent said swing arm from rotating to said open position after said swing arm is rotated to said closed position.

19. A swing-away vehicle mounted article transport system to be coupled to a hitch having an opened end and being located at the rear of a motor vehicle at which to transport an article, said article transport system comprising:
   a stationary base having a hitch coupler extending therefrom for receipt through the opened end of the hitch at the rear of the motor vehicle by which said swing-away article transport system is coupled to said vehicle hitch;
   a rotatable swing arm having opposite free and coupled ends, the coupled end of said swing arm being pivotally coupled to said stationary base such that said swing arm is rotatable relative to said stationary base between a closed position lying side-by-side said stationary base at the rear of the motor vehicle and an open position extending outwardly from said stationary base and away from the rear of the motor vehicle;
   a coupler connected to said rotatable swing arm to which the article to be transported by said swing-away article transport system is to be attached so that the article and said rotatable swing arm rotate together when said swing arm rotates between said closed and open positions; and
   an anti-wobble stop having first and opposite ends and extending at an angle completely through and outwardly from the hitch coupler of said stationary base such that the first end of said anti-wobble stop is spaced from the hitch located at the rear of the motor vehicle within which said hitch coupler is received and the opposite end of said anti-wobble stop penetrates said hitch coupler at which to engage the opened end of the vehicle hitch so as to reduce wobbling of said hitch coupler within said vehicle hitch when the motor vehicle is in motion.

20. The swing-away vehicle mounted article transport system recited in claim 19, wherein said anti-wobble stop is a removable threaded fastener that extends completely through and outwardly from the hitch coupler of said stationary base by way of a threaded sleeve that runs at an angle through said hitch coupler so that said threaded fastener abuts the opened end of said vehicle hitch through which said hitch coupler is received.

21. A swing-away vehicle mounted article transport system to be coupled to a hitch at the rear of a motor vehicle and adapted to transport an article, said article transport system comprising:

a stationary base having a hitch coupler extending therefrom for receipt by the hitch at the rear of the motor vehicle by which said swing-away article transport system is coupled to said vehicle hitch;

a rotatable swing arm having opposite free and coupled ends and upper and lower reinforcing bars spaced from one another and extending between said opposite free and coupled ends, the coupled end of said swing arm being pivotally coupled to said stationary base such that said swing arm is rotatable relative to said stationary base between a closed position lying side-by-side said stationary base at the rear of the motor vehicle and an open position extending outwardly from said stationary base and away from the rear of the motor vehicle; and a coupler connected to said rotatable swing arm to which the article to be transported by said swing-away article transport system is to be attached so that the article and said rotatable swing arm rotate together when said swing arm rotates between said closed and open positions, said coupler lying between and running perpendicular relative to the upper and lower reinforcing bars of said rotatable swing arm.

\* \* \* \* \*